United States Patent
Escott et al.

(10) Patent No.: US 11,533,613 B2
(45) Date of Patent: Dec. 20, 2022

(54) PROVIDING SECURE COMMUNICATIONS BETWEEN COMPUTING DEVICES

(71) Applicant: QUALCOMM Incorporated, San Diego, CA (US)

(72) Inventors: Adrian Edward Escott, Reading (GB); William Whyte, Belmont, MA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/880,897

(22) Filed: May 21, 2020

(65) Prior Publication Data

US 2021/0051473 A1 Feb. 18, 2021

Related U.S. Application Data

(60) Provisional application No. 62/888,266, filed on Aug. 16, 2019.

(51) Int. Cl.
*H04W 12/0431* (2021.01)
*H04W 12/033* (2021.01)
(Continued)

(52) U.S. Cl.
CPC ......... *H04W 12/0431* (2021.01); *H04W 4/40* (2018.02); *H04W 12/033* (2021.01); *H04W 12/041* (2021.01); *H04W 12/106* (2021.01)

(58) Field of Classification Search
CPC ........... H04W 12/0431; H04W 12/033; H04W 12/041; H04W 12/106; H04W 12/043;
(Continued)

(56) References Cited

U.S. PATENT DOCUMENTS 9,876,821 B2 * 1/2018 Delsol ................... H04L 63/205
2016/0262019 A1 * 9/2016 Suh ........................ H04L 9/3271
(Continued)

OTHER PUBLICATIONS

3GPP TR 33.833 V0.4.0 (Feb. 2014), 3rd Generation Partnership Project; Technical Specification Group Services and System Aspects Study on security issues to support Proximity Services (Release 12), IDS dated May 20, 2021 (Year: 2014).*
(Continued)

*Primary Examiner* — Fatoumata Traore
*Assistant Examiner* — Hamid Talaminaei
(74) *Attorney, Agent, or Firm* — The Marbury Law Group, PLLC

(57) ABSTRACT

Embodiments include devices and methods for providing secure communications between a first computing device and a second computing device are disclosed. A processor of the first computing device may determine in a first application software first security key establishment information. The processor may provide the first security key establishment information to a communication layer of the first computing device for transmission to the second computing device. The processor may receive, in the first application software from the communication layer of the first computing device, second security key establishment information received from the second computing device. The processor may determine a first security key by the first application software based at least in part on the second security key establishment information. The processor may provide the first security key to the communication layer for protecting messages from the first application software to the second computing device.

37 Claims, 15 Drawing Sheets

(51) Int. Cl.
*H04W 12/041* (2021.01)
*H04W 12/106* (2021.01)
*H04W 4/40* (2018.01)

(58) Field of Classification Search
CPC ... H04W 12/50; H04W 12/0471; H04W 4/40; H04W 4/44; H04W 4/70; H04W 4/02; H04W 4/21; H04W 4/46; H04W 12/02; H04W 12/06; H04L 63/04; H04L 67/12
See application file for complete search history.

(56) References Cited

U.S. PATENT DOCUMENTS

| | | | |
|---|---|---|---|
| 2017/0012956 A1 | 1/2017 | Lee et al. | |
| 2017/0163693 A1* | 6/2017 | Skuratovich | H04L 69/161 |
| 2018/0227279 A1* | 8/2018 | Kim | H04W 12/069 |
| 2018/0376304 A1 | 12/2018 | Cheng et al. | |
| 2019/0223008 A1 | 7/2019 | Vanderveen et al. | |
| 2019/0223063 A1 | 7/2019 | Palanigounder et al. | |
| 2020/0100088 A1* | 3/2020 | Kim | H04W 48/16 |
| 2020/0221298 A1* | 7/2020 | Pan | H04W 76/14 |
| 2021/0127362 A1* | 4/2021 | Jin | H04W 4/40 |

OTHER PUBLICATIONS

3GPP TR 33.833 V0.4.0 (IDS dated May 20, 2021; 3rd Generation Partnership Project; Technical Specification Group Services and System Aspects Study on security issues to support Proximity Services). (Year: 2014).*

3GPP TR 33.833 V0.4.0: "3rd Generation Partnership Project; Technical Specification Group Services and System Aspects Study on Security Issues to Support Proximity Services (Release 12)", 3GPP Draft, DRAFT_S3-140247_PROSE_TR_UPDATE_V2_RM, 3rd Generation Partnership Project (3GPP), Mobile Competence Centre, 650, Route Des Lucioles, F-06921 Sophia-Antipolis Cedex, France, Feb. 18, 2014 (Feb. 18, 2014), pp. 1-73, XP050771911, Retrieved from the Internet: URL: http://www.3gpp.org/ftp/tsg_sa/WG3_Security/TSGS3_74_Taipei/Docs/ [retrieved on Feb. 18, 2014] Figures 6.4.1.4.3.1-1, 6.4. 1.4.4-1 p. 47, line 31—p. 48, line 2, p. 49, line 12-line 28, p. 57, line 6—p. 58, line 1 p. 59, line 21—p. 60, line 9.

International Search Report and Written Opinion—PCT/US2020/034339—ISA/EPO—dated Aug. 28, 2020.

* cited by examiner

PROVIDING SECURE COMMUNICATIONS BETWEEN COMPUTING DEVICES

RELATED APPLICATIONS

This application claims the benefit of priority to U.S. Provisional Application No. 62/888,266 entitled "Providing Secure Communications Between Computing Devices" filed Aug. 16, 2019, the entire contents of which are incorporated herein by reference for all purposes.

BACKGROUND

ProSe is a protocol that has been standardized by 3GPP to provide secure negotiation and set up of secure communications, including identifiers (IDs) to identify the security credentials or keys used in establishing secure communication links. However, ProSe has not yet addressed the emerging vehicle-to-anything (V2X) use cases for authenticating devices interested in establishing secure direct (or unicast) communication links and establishing necessary keys to protect the communication links.

SUMMARY

Various aspects include methods for providing secure communications between a first computing device and a second computing device. Various aspects may include determining first security key establishment information in a first application software executing in a processor of the first computing device, providing the first security key establishment information to a communication layer of the first computing device in a format for transmission by the communication layer to the second computing device, receiving, in the first application software from the communication layer of the first computing device, second security key establishment information received from the second computing device, determining a first security key by the first application software based at least in part on the second security key establishment information received from the second computing device, and providing the first security key to the communication layer for use by the communication layer in protecting transmissions of messages from the first application software to the second computing device.

Some aspects may include receiving from the communication layer in the first application software executing in the processor of the first computing device third security key establishment information sent by the second computing device. In such aspects, determining the first security key by the first application software based at least in part on the second security key establishment information received from the second computing device may include determining the first security key based at least in part on the second security key establishment information and the third security key establishment information.

Some aspects may include selecting, by the first application software, a key establishment algorithm or method to be used in for determining content of the first security key establishment information, and including the selected key establishment algorithm or method in the first security key establishment information. Some aspects may include receiving from the communication layer in a second application software executing in the processor of the first computing device fourth security key establishment information sent by the second computing device, and determining a second security key by the second application software based at least in part on the fourth security key establishment information received from the second computing device. Such aspects may include determining, by the second application software, from information in the fourth security key establishment information received from the second computing device, at least an encryption or integrity algorithm to be used in protecting messages from the second application software to the second computing device.

Some aspects may include providing by the first application software to the communication layer further security key establishment information for transmission to the second computing device, receiving by the first application software from the communication layer further security key establishment information received from the second computing device, and using the further security key establishment information by the first application software in determining the first security key. Some aspects may include providing data packets by the first application software to the communication layer for transmission to the second computing device, protecting the data packets by the communication layer using the first security key, and transmitting the protected data packets to the second computing device.

Some aspects may include transmitting the protected data packets to the second computing device by the communication layer via a PC5 protocol. In some aspects, the first application software may include a first application of an application layer executing in the processor of the first computing device. In some aspects, the first application may include a vehicle-to-everything application. In some aspects, the first computing device may include a first in-vehicle computing device of a first vehicle. In some aspects, the second computing device may include a second in-vehicle computing device of a second vehicle. In some aspects, the communication layer of the first computing device may include a PC5 layer of the first computing device.

Some aspects may include establishing, using the first security key, a communication layer security context with a communication layer of the second computing device. In some aspects, the first security key establishment information and the second security key establishment information may include information needed to be exchanged between two applications to enable the two applications to agree on a root key for one-to-one communications between apps. In some aspects, the root key may include a 256-bit key.

Some aspects may include transmitting the first security key establishment information to the second computing device on a control plane bearer of the communication layer. In such aspects, the control plane bearer may include a control plane bearer of a PC5 interface between the first computing device and the second computing device. Some aspects may include protecting data packets from the first application software by the communication layer using the first security key, and transmitting the protected data packets to the second computing device on a user plane bearer of the communication layer.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above. Further aspects include a system on chip for use in a computing device that includes a processor configured to perform one or more operations of the methods summarized above. Further aspects include a system in a package that includes two systems on chip for use in a computing device that includes a processor configured to perform one or more operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1A:
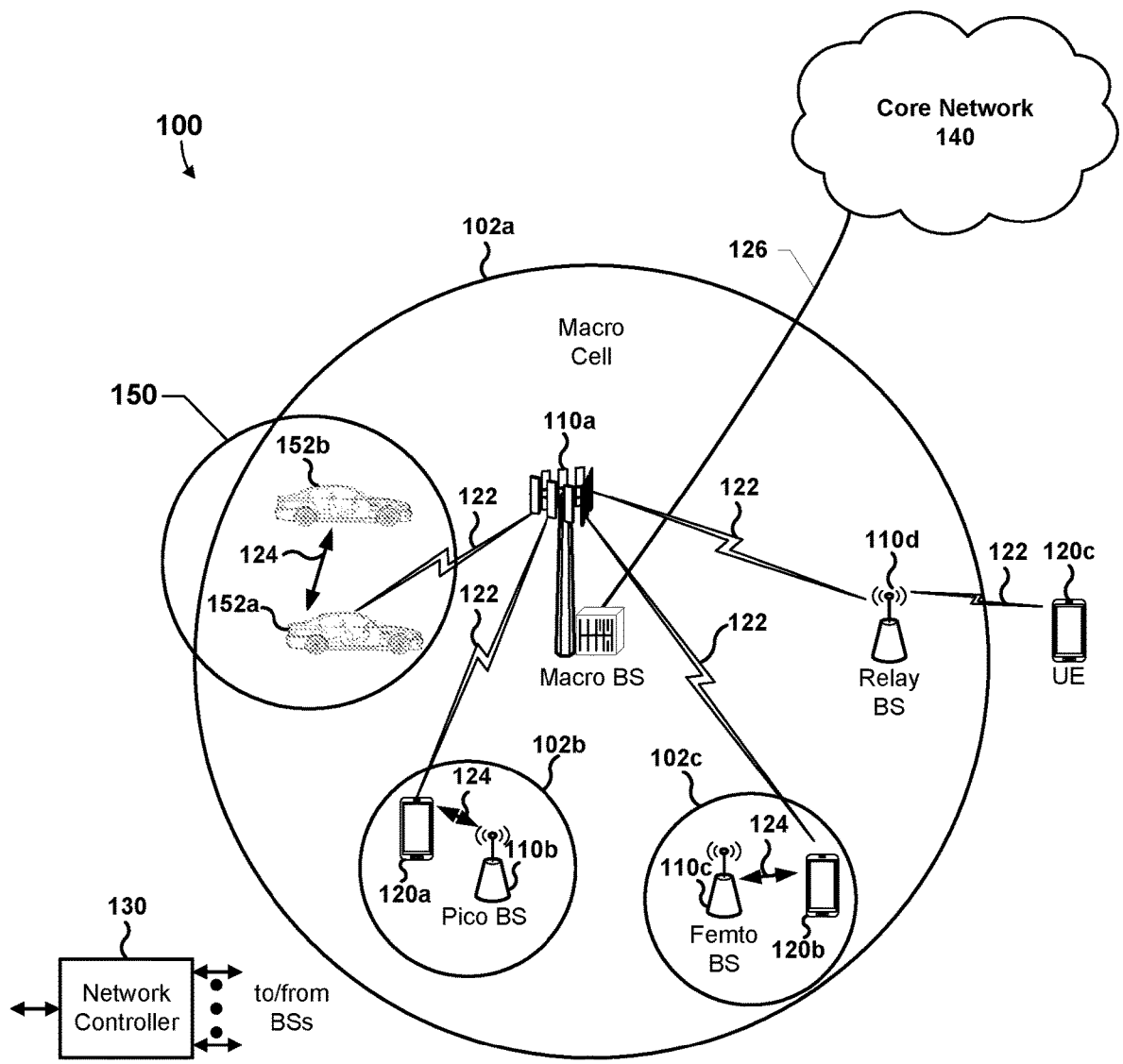
FIG. 1A is a system block diagram illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" is used herein to refer to any one or all of router devices (wired or wireless), appliances (wired or wireless), cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory and a programmable processor. Computing devices that include wireless communication components and are configured to communicate with other computing devices via wireless communication links (e.g., cellular telephones, smartphones, etc.) are referred to herein as "wireless computing devices."

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

"PC5" refers to a device-to-device communication interface that may be used for single device-to-device communication or one-to-many communication. For example, the PC5 interface may be used in vehicle-to-everything (V2X) communication to enable communicating information between a vehicle and any entity that may affect the vehicle (for example, V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid) communications).

The "ProSe" (Proximity-based Services) protocol is the PC5 protocol in LTE that provides D2D (device-to-device) communication technology or communication protocol that enables devices to detect each other and to communicate directly. PC5 and ProSe may enable a range of communication services based on device proximity, for example, advertising, social networking, gaming, relaying traffic for wearable devices, and V2X communication.

Communication security may be provided in PC5 and ProSe using a hierarchy of security keys. A long-term key may be provisioned in a device and may serve as a primary information for security for D2D communications. A root key (which may be referred to as $K_D$) may be shared between two devices communicating directly, for example, using ProSe Direct one-to-one communications. In some embodiments, the root key may include a 256-bit key. The root key may be established or refreshed by re-running the authentication signaling using the long-term key. One or more application(s) running on a device may include its own long-term key in code or in associated memory, which may be used for authenticating the two devices interested in establishing secure direct communication links. The root key, $K_D$, may be established between two interested devices after successful authentication using the long-term key. The authentication signaling between the applications running on the two or more devices may be transported using the PC5 layer of the communication layer of the devices. A session key (which may be referred to as $K_{D-sess}$) may be derived from the root key using nonces that are exchanged between communicating devices, and may be used in a specific security context being used, or in the process of being established, to protect data communication between two devices. Further, an encryption key and an integrity key (e.g., a ProSe Encryption Key (PEK) and a ProSe Integrity Key (PIK)) may be derived from $K_{D-sess}$. The PEK and PIK may be used in selected confidentiality and integrity algorithms, respectively. Such algorithms may include, for example, Snow3G, AES and ZUC-based algorithms. In some embodiments, the PEK and PIK may be refreshed automatically every time $K_{D-sess}$ is changed.

As currently described in applicable 3GPP standards, security information needed to establish keys between two devices may be handled via a communication layer (e.g., a PC5 interface). In such implementations, the communication layer handles key information and an authentication method utilizing the key information, and performs derivation of one or more keys to protect the communication layer. Typically, this requires manual coding or pre-configuration into the communication layer (e.g., a PC5 layer) of a device of security information needed to establish security keys. Such a requirement limits the use cases that can be supported as the authentication method and the associated credentials need to be known to the communication layer.

Various embodiments include methods that may be implemented on a processor of a communication device for providing secure communications between a first computing device and a second computing device. Various embodiments provide a security architecture and method for providing D2D security as a generic feature for link establishment between devices. Various embodiments may provide communication security for a plurality of communication devices, such as a fleet of vehicles, a plurality of computing devices, and other suitable communication devices. Various embodiments may provide communication security for direct D2D communication between two devices (e.g., mobile communication devices, vehicles, or other suitable devices).

In some embodiments, a first computing device may be configured to enable generation, handling, and storage of communication security keys at an application layer of the first computing device (e.g., an application on the first computing device). In some embodiments, the first computing device may be configured to manage, determine, or select an authentication method for use with a second computing device. In some embodiments, the first computing device may be configured to use a communication layer (e.g., via a PC5 interface) to transport information to a second computing device information enabling the second computing device to generate security keys and to determine (e.g., select) an authentication method to be used by the first and second computing devices. In some embodiments, the second computing device may receive the information from the first computing device via the communication layer, and the communication layer of the second device may provide the received information to an application layer of the second computing device (e.g., an application on the second computing device). In some embodiments, the application layer of the second computing device (i.e., an application on the second computing device) may likewise provide information enabling the first computing device to generate security keys and/or to determine an authentication method to be used by the first and second communication devices. The application layer of the second computing device may provide the information to a communication layer for transport to the first computing device. In some embodiments, the first computing device may be configured to receive the information from the second computing device at the communication layer, and the communication layer may provide the received information to the application layer of the first computing device (e.g., an application on the first computing device).

In various embodiments, the application on the first computing device may be configured to transmit authentication messages to the second computing device via the communication layer, and to receive authentication messages from the second computing device, without the communication layer processing the content of the authentication messages (e.g., content of security keys, authentication credentials, authentication method, and the like). In some embodiments, the second computing device may likewise be configured to perform similar operations with respect to the first computing device. In some embodiments, the application on the first computing device may perform authentication operations to authenticate the second computing device. The second computing device may be configured to perform similar operations regarding the first computing device. In some embodiments, in the event that the first computing device authenticates the second computing device, the application layer of the first computing device (i.e., an application on the first computing device) may provide security keys to the communication layer of the first computing device for use in protecting the communication link between the first and second computing devices. The second computing device may be configured to perform similar operations with regard to the first computing device. In various embodiments, the method by which the first application software executing on the processor may determine the first security key may be unknown to the communication layer of the first computing device. In some embodiments, the method by which the first application software may determine the first security key may be changed or altered (e.g., by the application or an update to the application) without requiring any change to the communication layer.

FIG. 1A illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of computing devices (illustrated as wireless devices 120a-120c and vehicles 152a and 152b in FIG. 1). The communications system 100 may also include a number of base stations (illustrated as the BS 110a, the BS 110b, the BS 110c, and the BS 110d) and other network entities. A base station is an entity that communicates with wireless computing devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless computing devices with service subscription. A pico cell may cover a relatively small geographic area and may allow unrestricted access by wireless computing devices with service subscription. A femto cell may cover a relatively small geographic area (for example, a home) and may allow restricted access by wireless computing devices having association with the femto cell (for example, wireless computing devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless computing device 120a-120c and vehicles 152a and 152b may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless computing device) and send a transmission of the data to a downstream station (for example, a wireless computing device or a base station). A relay station also may be a wireless computing device that can relay transmissions for other wireless computing devices. In the example illustrated in FIG. 1, a relay station 110d may communicate with macro the base station 110a and the wireless computing device 120c in order to facilitate communication between the base station 110a and the wireless computing device 120c. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless computing devices 120a, 120b may be dispersed throughout communications system 100, and each wireless computing device may be stationary or mobile. A wireless computing device also may be referred to as an access terminal, a terminal, a mobile station, a subscriber unit, a station, etc.

A macro base station 110a may communicate with the communication network 140 over a wired or wireless communication link 126. The wireless computing devices 120a, 120b may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE). In some embodiments, the wireless communication links 122 and 124 may include direct connection communication links that may be established over a PC5 interface in accordance with applicable 3GPP standards.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless computing device. Multi-layer transmissions with up to 2 streams per wireless computing device may be supported. Aggregation of multiple cells may be supported with up to eight serving cells. Alternatively, NR may support a different air interface, other than an OFDM-based air interface.

Some computing devices may be considered machine-type communication (MTC) or evolved or enhanced machine-type communication (eMTC) computing devices. MTC and eMTC computing devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some computing devices may be considered Internet-of-Things (IoT) devices or may be implemented as NB-IoT (narrowband internet of things) devices. The wireless computing devices 120a-e may be included inside a housing that houses components of the wireless computing device, such as processor components, memory components, similar components, or a combination thereof.

In general, any number of communications systems and any number of computing networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more computing devices (for example, illustrated as controllers 160 the vehicle 152a and the vehicle 152b) may communicate directly using one or more sidelink channels without using a base station 110a-d as an intermediary to communicate with one another. For example, the vehicles 152a, 152b may communicate using peer-to-peer (P2P) communications, device-to-device (D2D) communications, a vehicle-to-everything (V2X) protocol, which may include a vehicle-to-vehicle (V2V) protocol, a vehicle-to-infrastructure (V2I) protocol, a vehicle-to-pedestrian (V2P) protocol, or similar protocol, a mesh network, or similar networks, or combinations thereof. In this case, the controllers in vehicles 152a, 152b may perform scheduling operations, resource selection operations, as well as other operations described elsewhere herein as being performed by the base station 110a. Vehicles 152a, 152b communicating with one another may be considered a subnetwork 150 as described with reference to FIG. 1B.

Figure 1B:
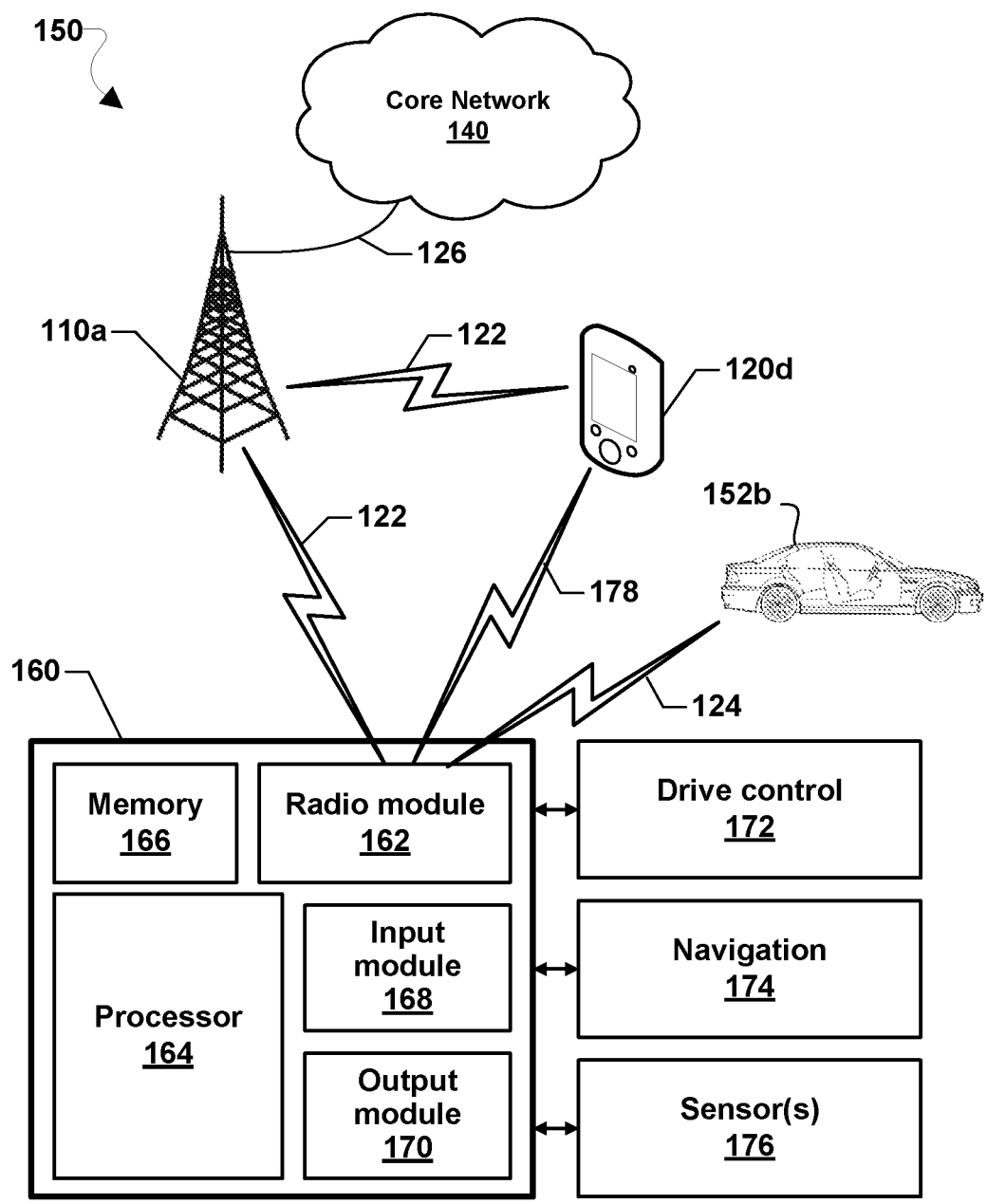
FIG. 1B is a component and system block diagram illustrating a communication system an example communications system between two vehicles suitable for use with various embodiments.

FIG. 1B is a system and component block diagram illustrating a system 150 of components and support systems suitable for implementing various embodiments. With reference to FIGS. 1A and 1B, a vehicle 152a may include a control unit 160, which may include various circuits and devices used to control the operation of the vehicle 100 as well as communicate with other vehicles that are similarly equipped. In the example illustrated in FIG. 1B, the control unit 160 includes a radio module 162, a processor 164, memory 166, an input module 168, and an output module 170. The control unit 160 may be coupled to and configured to control drive control components 172, navigation components 174, and one or more sensors 176 of the vehicle 152a.

The control unit 160 may include a processor 164 that may be configured with processor-executable instructions to control maneuvering, navigation, and/or other operations of the vehicle 152a, including operations of various embodiments. The processor 164 may be coupled to the memory 166. The control unit 162 may include the input module 168, the output module 170, and the radio module 162.

The radio module 162 may be configured for wireless communications, including implementing operations of various embodiments. The radio module 162 may exchange wireless signals 122 with a base station and wireless signals 124 with control units in other vehicles 152b as described herein. In some embodiments, the radio module 162 may also enable the vehicle 152a (e.g., an infotainment system) to communicate with a wireless communication device 120d through a bidirectional wireless communication link 178, such as a Bluetooth wireless data link.

The input module 168 may receive sensor data from one or more vehicle sensors 176 as well as electronic signals from other components, including the drive control components 172 and the navigation components 174. The output module 170 may be used to communicate with or activate various components of the vehicle 152a, including the drive control components 172, the navigation components 174, and the sensor(s) 176.

The control unit 160 may be coupled to the drive control components 172 to control physical elements of the vehicle 152a related to maneuvering and navigation of the vehicle, such as the engine, motors, throttles, steering elements, flight control elements, braking or deceleration elements, and the like.

The control unit 160 may be coupled to the navigation components 174, and may receive data from the navigation components 174 and be configured to use such data to determine the present position and orientation of the vehicle 152a, as well as an appropriate course toward a destination.

The processor 164 and/or the navigation components 174 may be configured to communicate with a core network 140 (e.g., the Internet) using a wireless connection 122 with a cellular data network base station 110a. The processor 164 may also be configured to perform a variety of software application programs by executing processor-executable instructions in an application layer as described herein.

While the control unit 160 is described as including separate components, in some embodiments some or all of the components (e.g., the processor 164, the memory 166, the input module 168, the output module 170, and the radio module 162) may be integrated in a single device or module, such as a system-on-chip (SOC) or system-in-package (SIP) processing device, such as described with reference to FIG. 2. Such an SOC or SIP processing device may be configured for use in vehicles and be configured, such as with processor-executable instructions executing in the processor 164, to perform operations of various embodiments when installed into a vehicle.

In some implementations, the communication system 100 may include one or more devices configured to communicate as part of an intelligent transportation system (ITS). ITS technologies may increase intercommunication and safety for driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines transmission modes that provide non-line-of-sight awareness and a higher level of predictability for enhanced road safety and autonomous driving. Such C-V2X transmission modes may include V2V, V2I, and V2P, and may utilize frequencies in a 5.9 gigahertz (GHz) spectrum that is independent of a cellular network. C-V2X transmission modes may also include vehicle-to-network communications (V2N) in mobile broadband systems and technologies, such as 3G mobile communication technologies (e.g., GSM evolution (EDGE) systems, CDMA 2000 systems, etc.), 4G communication technologies (e.g., LTE, LTE-Advanced, WiMAX, etc.), as well as 5G systems.

Various embodiments may be implemented on a number of single processor and multiprocessor computer systems, including a system-on-chip (SOC) or system in a package (SIP). FIG. 2 illustrates an example computing system or SIP 200 architecture that may be used in computing devices implementing the various embodiments.

Figure 2:
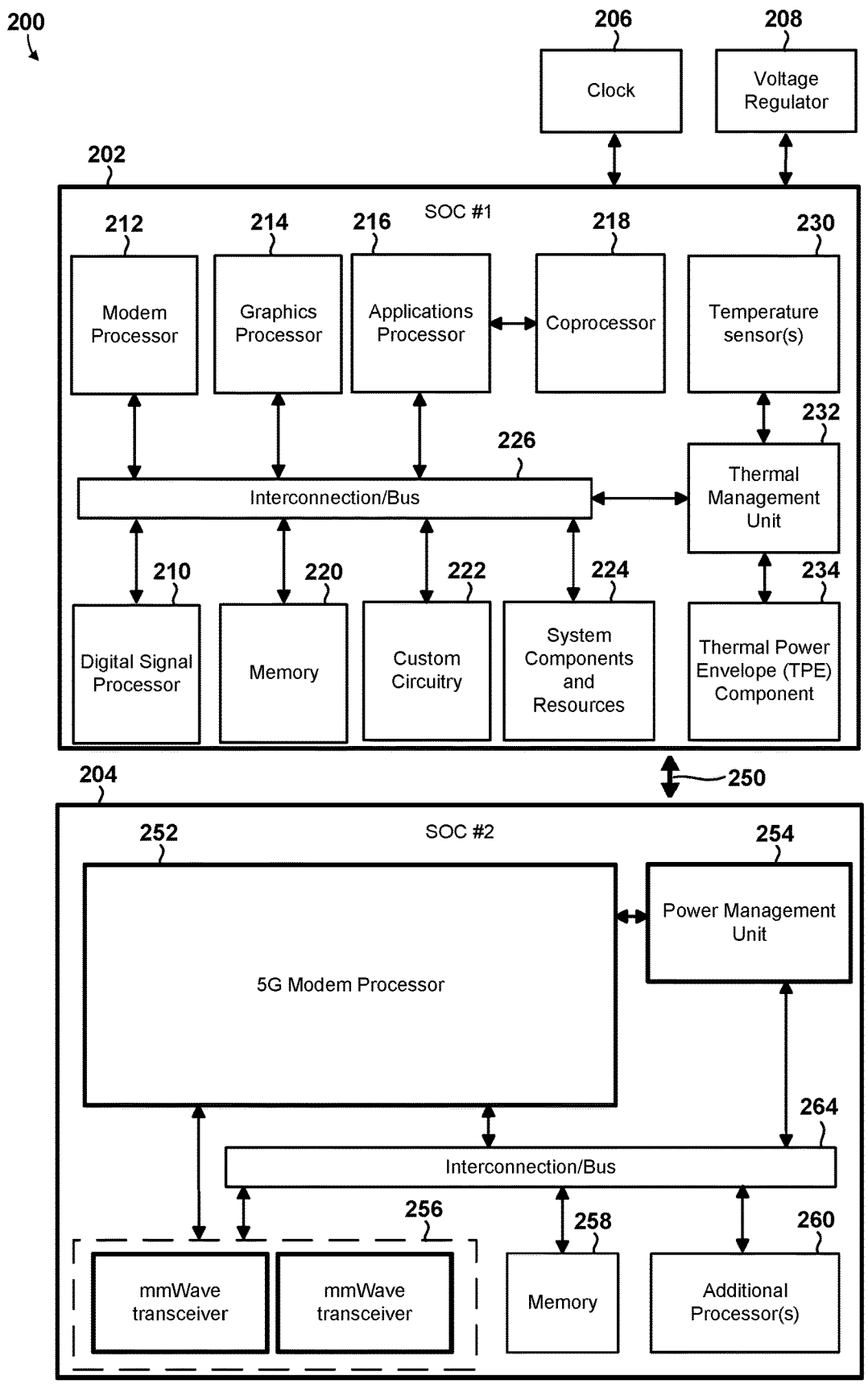
FIG. 2 is a component block diagram illustrating a computing system suitable for use with various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
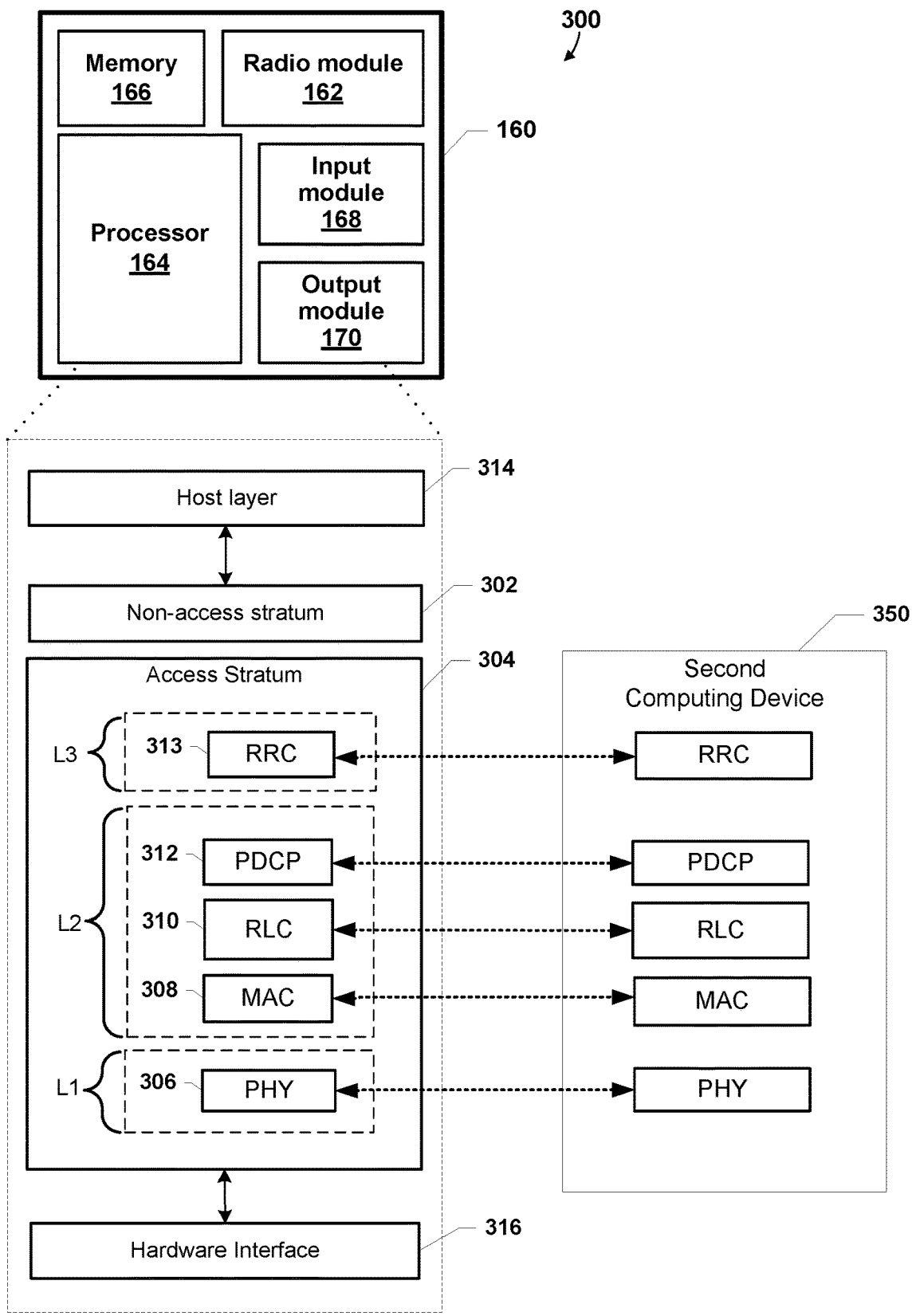
FIG. 3 is a diagram illustrating an example of a software architecture including a radio protocol stack for the user and control planes in wireless communications according to various embodiments.

FIG. 3 illustrates an example of a software architecture 300 including a radio protocol stack for the user and control planes in wireless communications between a vehicle controller 160 (e.g., a controller of the vehicle 152a, or SIP 200) and a second computing device 350 in a second vehicle 152b. In some embodiments, the vehicle controller 160 and the second computing device 350 of the second vehicle 152b may communicate via D2D communication or another suitable device-to-device communication method. With reference to FIGS. 1-3, the vehicle controller 160 may implement the software architecture 300 to communicate with the second vehicle 152b of a communication system (e.g., 100). In various embodiments, layers in the software architecture 300 in the vehicle controller 160 of the first vehicle 152a may form logical connections with corresponding layers in software of the second computing device 350 of the second vehicle 152b. The software architecture 300 may be distributed among one or more processors (e.g., the processors 212, 214, 216, 218, 252, 260). While illustrated with respect to one radio protocol stack, in a multi-SIM (subscriber identity module) wireless computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the controller 160 of a first vehicle 152a and the second controller of the second vehicle 152b over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the controller of the second vehicle 152b.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the controller 160 of a first vehicle 152a and the controller of the second vehicle 152b. The direct communication messages from the applications layer may be transmitted either directly over L2 or L3, or via another signaling layer (e.g., PC5-signaling or PC5-S) over L2 or L3.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the controller 160 of a first vehicle 152a. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency transceivers).

Figure 4:
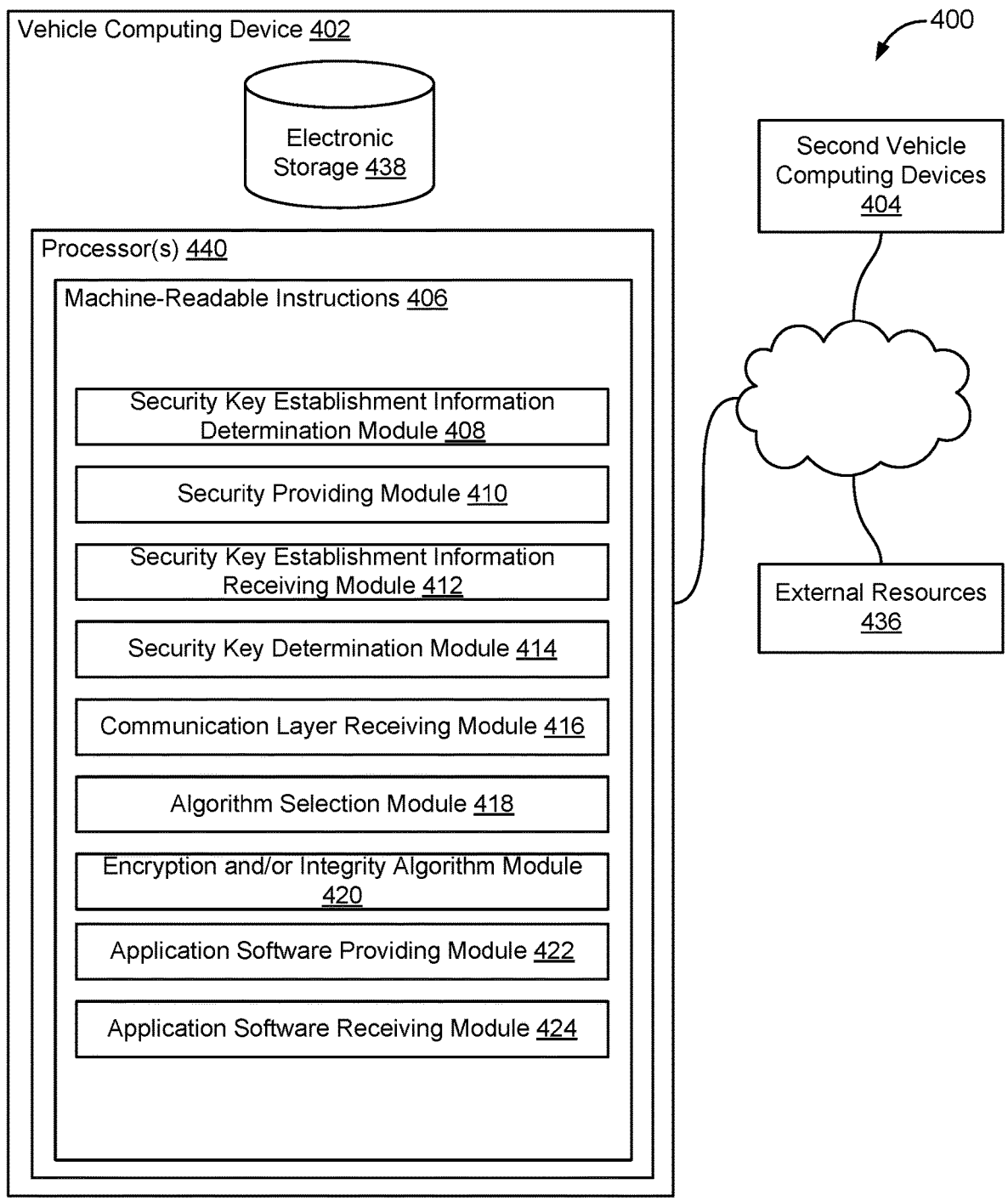
FIG. 4 is a component block diagram illustrating a system configured for providing secure communications between a first computing device and a second computing device according to various embodiments.

FIG. 4 is a component block diagram illustrating a system 400 configured for providing secure communications between a first computing device and a second computing device in accordance with various embodiments. In some embodiments, system 400 may include one or more vehicle computing device 402 and/or one or more other vehicle computing devices 404. With reference to FIGS. 1-4, vehicle computing device 402 may include a base station (e.g., the base station 110a-110d), a controller 160 of a vehicle 152a, 152b, and/or a computing device (e.g., the wireless computing device 120a-120c, 200). Other vehicle computing devices 404 may include a base station (e.g., the base station 110a-110d), a controller 160 of a vehicle 152a, 152b and/or a computing device (e.g., the wireless computing device 120a-120c, 200).

Vehicle computing device 402 may be configured by machine-readable instructions 406. Machine-readable instructions 406 may include one or more instruction modules. The instruction modules may include computer program modules. The instruction modules may include one or more of a security key establishment information determination module 408, a security key providing module 410, a security key establishment information receiving module 412, a security key determination module 414, a communication layer receiving module 416, an algorithm selection module 418, an encryption and/or integrity algorithm module 420, an application software providing module 422, an application software receiving module 424, and/or other instruction modules.

The security key establishment information determination module 408 may be configured to determine, in a first application software executing in a processor of the first computing device, first security key establishment information. In some embodiments, the first application software may be a first application of an application layer executing in the processor of the first computing device. In some embodiments, the first computing device may be a first in-vehicle computing device of a first vehicle.

The security providing module 410 may be configured to provide the first security key establishment information to a communication layer of the first computing device in a format for transmission by the communication layer to the second computing device. In some embodiments, the communication layer of the first computing device may be a PC5 layer of the first computing device. In some embodiments, the root key may be a 256-bit key. In some embodiments, the security providing module 410 may be configured to provide the second security key to the communication layer for use in encrypting transmissions of messages from the second application software to the second computing device. In some embodiments, the security providing module 410 may be configured to provide other security key establishment information to the communication layer for transmission to the second computing device. In some embodiments, the security key providing module 410 may be configured to provide the first security key to the communication layer for use by the communication layer in encrypting transmissions of messages from the first application software to the second computing device.

The security key establishment information receiving module 412 may be configured to receive, in the first application software from the communication layer of the first computing device, second security key establishment information received from the second computing device. In some embodiments, the first security key establishment information and the second security key establishment information may include information needed to be exchanged between two applications to enable the two applications to agree on a root key for one-to-one communications. In some embodiments, the control plane bearer may be a control plane bearer of a PC5 interface between the first computing device and the second computing device.

The security key determination module 414 may be configured to determine a first security key by the first application software based at least in part on the second security key establishment information received from the second computing device. In some embodiments, the security key determination module 414 may be configured to determine a second security key and third security key establishment information by the second application software executing in the processor based at least in part on the received third security key establishment information and information known to the second application software.

The communication layer receiving module 416 may be configured to receive from the communication layer in a second application software executing in the processor of the first computing device third security key establishment information sent by the second computing device.

The algorithm selection module 418 may be configured to select, by the first application software, an encryption algorithm to be used in encrypting messages from the first application software to the second computing device. The encryption and/or integrity algorithm including module 420 may be configured to include the selected encryption algorithm and/or integrity algorithm in the first security key establishment information.

The application software providing module 422 may be configured to provide by the first application software to the communication layer further security key establishment information for transmission to the second computing device. The application software receiving module 424 may be configured to receive by the first application software from the communication layer further security key establishment information received from the second computing device.

Figure 5A:
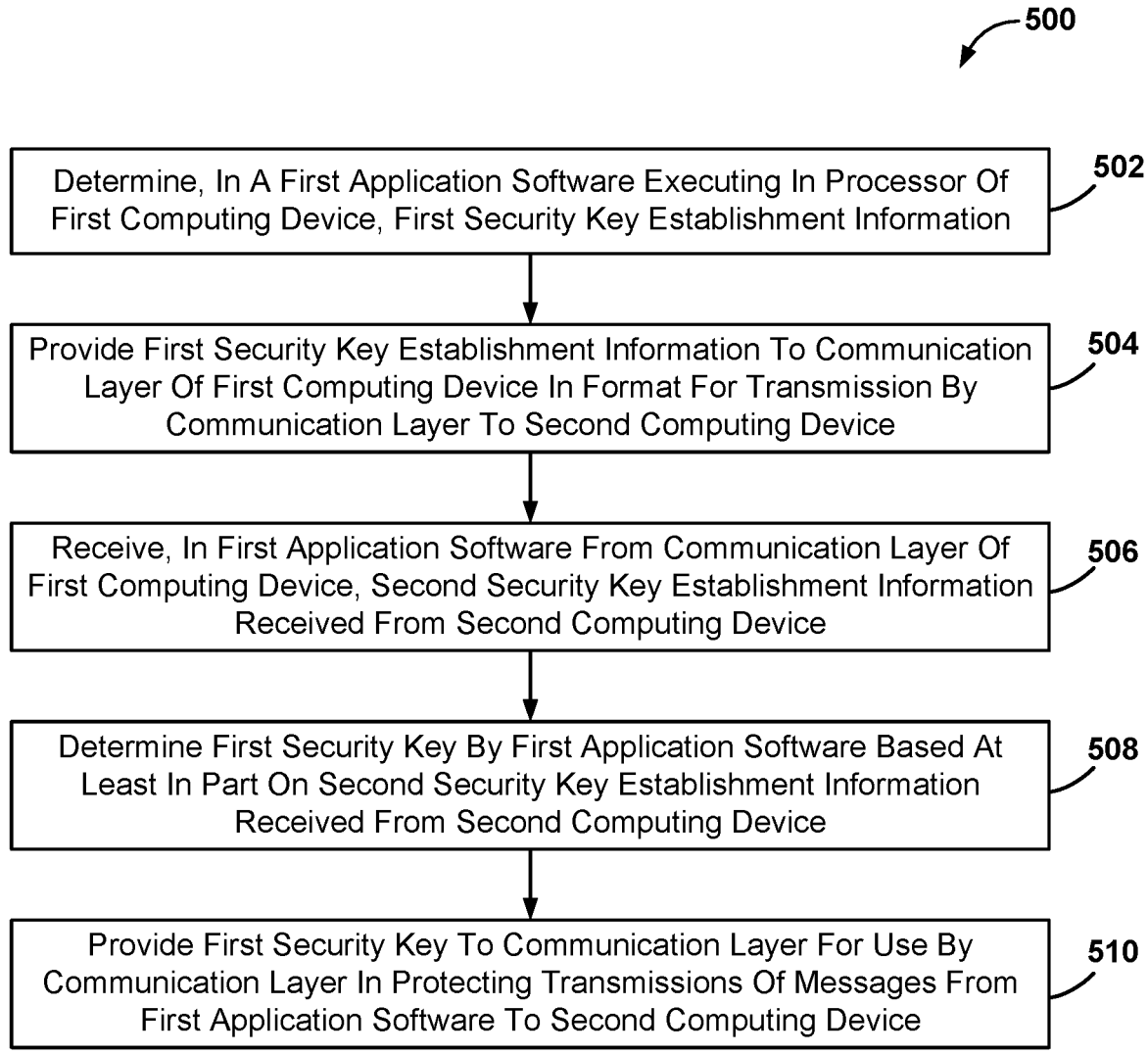
FIG. 5A is a process flow diagram illustrating a method for providing secure communications between a first computing device and a second computing device according to various embodiments.
Figure 5B:
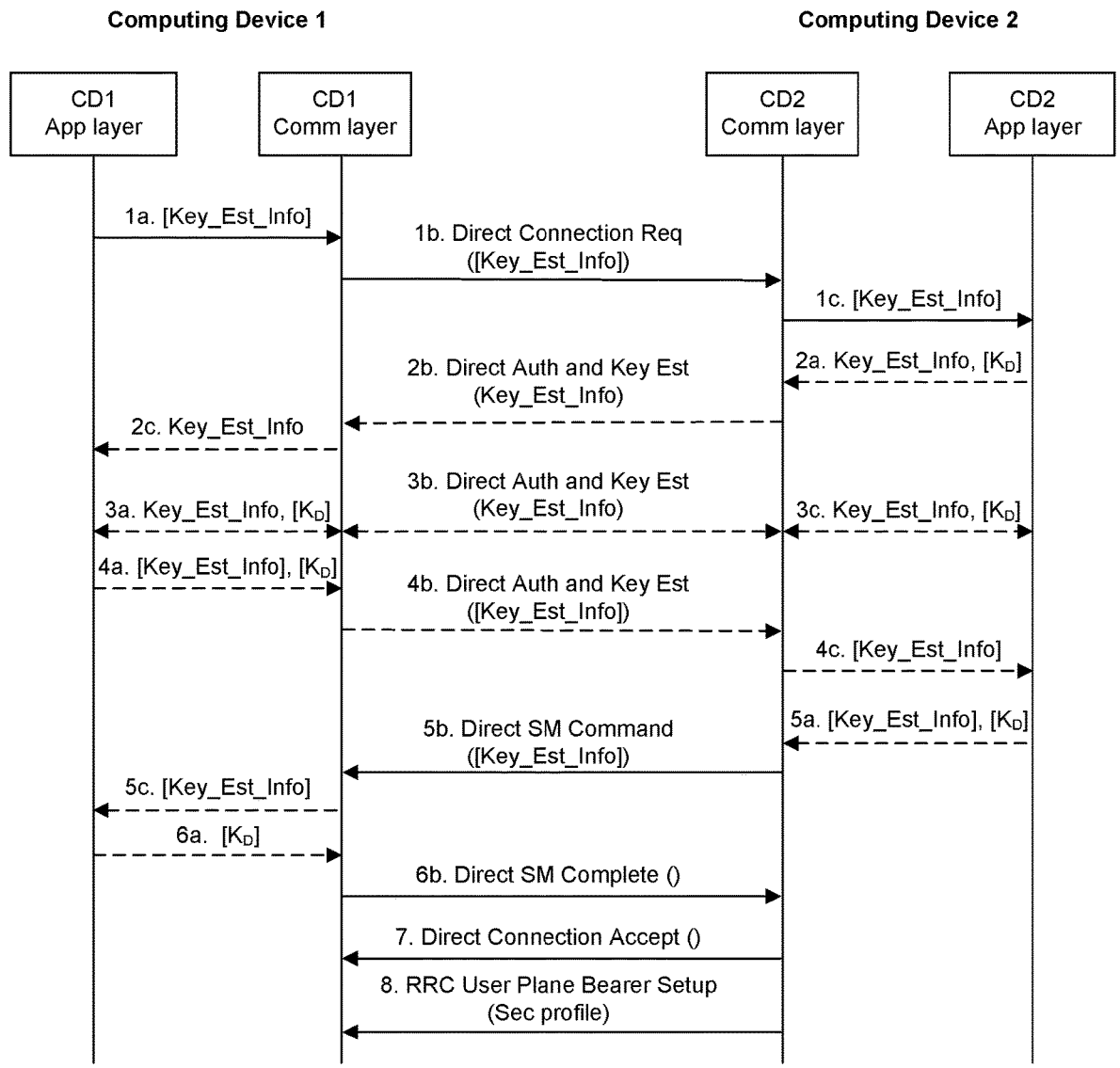
FIG. 5B is a message flow diagram illustrating a method for providing secure communications between a first computing device and a second computing device according to various embodiments.

FIG. 5A is a process flow diagram, and FIG. 5B is a message flow diagram, illustrating a method 500 for providing secure communications between a first computing device and a second computing device according to various embodiments. With reference to FIGS. 1-5B, the method 500 may be implemented by a processor (such as 212, 216, 252 or 260) of a computing device (such as a controller 160 of a first vehicle 152a, a wireless computing device 120a-120c, 200).

In block 502, the processor may determine, in a first application software executing in a processor of the first computing device, first security key establishment information. For example, the processor in a first computing device (e.g., Computing Device 1) may determine in a first application software (e.g., CD1 App layer) a first security key establishment information (e.g., Key_Est_Info). In some embodiments, the first security key establishment information may include information that may enable a second computing device to determine a root key (e.g., $K_D$). In some embodiments, the first application software may be a first application of an application layer executing in the processor of the first computing device. In some embodiments, the first application may include a vehicle-to-everything application. In some embodiments, first computing device may include a first in-vehicle computing device of a first vehicle. In some embodiments, second computing device may include a second in-vehicle computing device of a second vehicle. In some embodiments, the first security key establishment information may be sent along with a request to establish communications, while in other embodiments the first security key establishment information may be sent in response to such a request. In some embodiments, the security key establishment information is transparent to the communication layer. In such embodiments, the security key establishment information is not understood by the communication layers. This enables different application software to use different key establishment methods, as well as enable an application to change its key establishment method.

In block 504, the processor may provide the first security key establishment information to a communication layer of the first computing device in a format for transmission by the communication layer to the second computing device. For example, the processor may provide message 1a (FIG. 5B) including the security key establishment information (e.g., Key_Est_Info) from an application layer (WD1 App layer) to a communication layer (WD1 Comm layer). In some embodiments, the format for transmission by the communication layer may include providing, packaging, or wrapping the first security key establishment information provided by the first application software in a manner that enables the communication layer to transport the first security key establishment information without the communication layer performing any processing of the information itself, such as within a message wrapper or message container.

In some embodiments, the processor may transmit the security key establishment information (e.g., message 1b) to a second computing device (e.g., Computing Device 2) via the communication layer. In some embodiments, message 1b may include a direct connection request. In some embodiments, the message 1b may be broadcast to one or more devices. In some embodiments, the direct connection request may include the security key establishment information. A processor of the second computing device may receive the security key establishment information at the communication layer, and may provide the security key establishment information (e.g., message 1c) to an application running on the second computing device in an application layer (e.g., CD2 App layer). In some embodiments, more than one computing device may be interested in establishing direct communications with the first computing device. In such a case, each of the interested devices may respond independently as the second computing device described herein in order to establish the shared root key (i.e., $K_D$) between the two communicating devices.

In various embodiments, the first and second computing devices may exchange one or more elements of security key establishment information in one or more messages or transmissions. For example, messages 2a, 2b, and 2c represent a scenario in which a second application executing in a processor of the second computing device is able to derive a security key ($K_D$) from security key establishment information received from the first computing device. In this scenario, the application executing on the second computing device may provide the derived security key from the application layer (CD2 App layer) to the communication layer (CD2 Comm layer). The application executing on the second computing device may also provide additional security key establishment information to the communication layer of the second computing device. The communication layer of the second computing device may provide the additional security key establishment information to the communication layer of the first computing device (CD2 Comm layer) in message 2b. The communication layer of the first computing device may provide the additional security key establishment information to the first application software executing in the application layer of the first computing device in message 2c. In some embodiments, the second computing device may omit messages 2a-2c, 3a-3c and 4a-4c, and may respond to message 1c with message 5a.

Messages 3a, 3b, and 3c represent one or more additional exchanges of security key establishment information between the first and second computing devices. In some embodiments, different types of credentials may be required by the applications executing in each of the first and second computing devices to determine a security key. For example, different types of long term keys may necessitate the exchange of different types of information, different quantities information, etc. between the applications executing in the first and second computing devices. When an application is able to determine a security key ($K_D$), the application provides the determined security key to the communication layer. For example, when the application executing in the application layer of the first computing device determines the security key, the application may provide the security key to the communication layer of the first computing device via a message illustrated as message 3a. Similarly, when the application executing in the application layer of the second computing device determines the security key, the application may provide the security key to the communication layer of the second computing device via a message illustrated as message 3c. Messages 3a, 3b, and 3c are optional, and in some embodiments, messages 3a, 3b and 3c are not sent.

Messages 4a, 4b, and 4c may represent a scenario in which the application executing in the first computing device determines the security key before the application executing in the second computing device. In this scenario, the application executing in the application layer of the first computing device (CD1 App layer) may provide the security key to the communication layer of the first computing device (CD1 Comm layer). In some embodiments, the application of the first computing device may provide further security key establishment information to the communication layer of the first computing device, and the communication layer of the first computing device may provide the additional security key establishment information to the communication layer of the second computing device (CD2 Comm layer) in message 4b. The communication layer of the second computing device may provide the additional security key establishment information to the second application software executing in the application layer of the second computing device in message 4c. When the application executing in the application layer of the second computing device (CD2 App layer) is able to determine the security key, the application may provide the determined security key to the communication layer of the second computing device (CD2 Comm layer) in message 5a.

Messages 5a, 5b, and 5c represent a scenario in which the application executing on the second computing device is able to determine the security key before the application executing on the first computing device. As indicated above, the application executing on the second computing device may provide the determined security key to the communication layer of the second computing device (CD2 Comm layer) in message 5a. The application of the second computing device may provide further security key establishment information to the communication layer of the second computing device, and the communication layer of the second computing device may provide the additional security key establishment information to the communication layer of the first computing device (CD1 Comm layer) in message 5b. In some embodiments, message 5b may include a Direct Security Mode (SM) Command. In some embodiments, message 5b may include information indicating a security context determined buyer selected by the second computing device. For example, message 5b may include information indicating an integrity algorithm or a ciphering algorithm that has been selected by the second computing device. The communication layer of the first computing device may provide the additional security key establishment information to the first application software executing in the application layer of the first computing device in message 5c.

In some embodiments, when the application executing in the application layer of the first computing device (CD1 App layer) is able to determine the security key, the application may provide the determined security key to the communication layer of the first computing device (CD1 Comm layer) in message 6a.

In block 506, the processor of the first computing device may receive, in the first application software from the communication layer of the first computing device, second security key establishment information received from the second computing device. For example, the processor of the first computing device may receive the second security key establishment information at the communication layer, and may provide the second security key establishment information e.g., (message 2c) to an application layer (e.g., CD1 App layer).

In some embodiments, the first security key establishment information and the second security key establishment information may include information needed to be exchanged between two applications to enable the two applications to authenticate each other and agree on a root key for one-to-one communications. In some embodiments, the root key may include a 256-bit key.

In block 508, the processor of the first computing device may determine a first security key by the first application software based at least in part on the second security key establishment information received from the second computing device. In some embodiments, the second security key establishment information may include information that may enable the first computing device to determine a root key (e.g., $K_D$). In some embodiments, the method by which the first application software executing on the processor may determine the first security key may be unknown to the communication layer of the first computing device. In some embodiments, the method by which the first application software may determine the first security key may be changed or altered without requiring any change to the communication layer.

In block 510, the processor of the first computing device may provide the first security key to the communication layer for use by the communication layer in protecting transmissions of messages from the first application software to the second computing device. In some embodiments, protecting transmissions of messages from the first application software to the second computing device may include establishing a protected (i.e., at least one of encrypted or integrity protected) tunnel between the communication layer of the first computing device and the communication layer of the second computing device.

In some embodiments, the processor may use the same security key establishment information to perform a separate run of the key determination processes to derive a key for protecting communications between the first application software on the first computing device and application software executing on the second computing device.

In some embodiments, the processor of the first computing device may send, via the communication layer of the first computing device (CD1 Comm layer) to the communication layer of the second computing device (CD2 Comm layer), a message indicating successful establishment of the security context between the first and second computing devices, in message 6b.

In some embodiments, the processor the second computing device may send a Direct Connection Accept message to the first computing device in message 7. In some embodiments, the processor of the second computing device may send a bearer setup message (e.g., RRC User Plane Bearer Setup) in message 8. In some embodiments, the bearer setup message may include security profile information for the direct communication bearers established on behalf of the application(s).

FIGS. 6A-6E are process flow diagrams illustrating methods 600a-600E that may be performed as part of or in conjunction with the method 500 (FIG. 5) for providing secure communications between a first computing device and a second computing device according to various embodiments. With reference to FIGS. 1-6E, the methods 600a-600E may be implemented by a processor (such as 212, 216, 252 or 260) of a computing device (such as a controller 160 of a vehicle 152a, or a wireless computing device 120a-120c, 200).

Figure 6A:
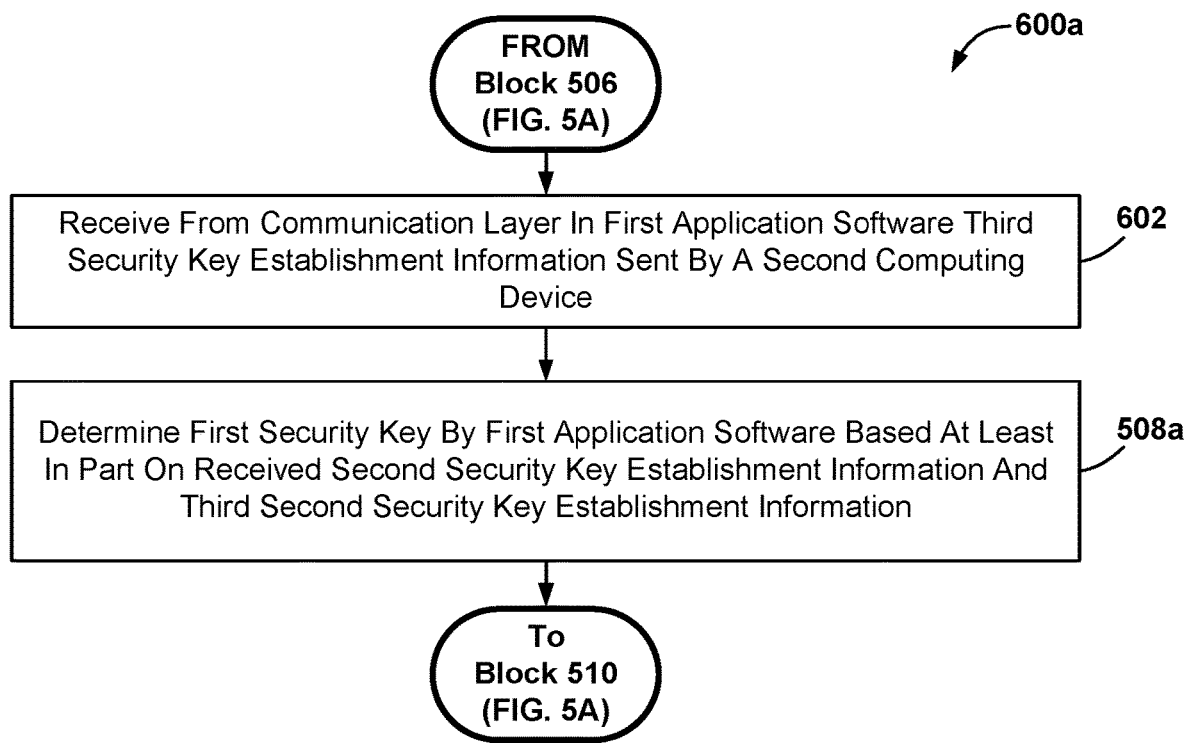
FIGS. 6A-6F are process flow diagrams illustrating methods for providing secure communications between a first computing device and a second computing device according to various embodiments.

In some embodiments, the first computing device and the second computing device may send and receive a plurality of messages including various key establishment information to enable the applications executing in each computing device to determine a security key. Referring to FIG. 6A, in some implementations following the operations of block 510 (FIG. 5A), in block 602, the first application software (i.e., executing in the processor of the first computing device) may receive from the communication layer third security key establishment information sent by the second computing device.

In block 508a, the processor may determine a first security key by the first application software executing in the processor based at least in part on the received second security key establishment information and the third security key establishment information. The processor may then perform the operations of block 510 of the method 500 as described with reference to FIG. 5A.

Figure 6B:
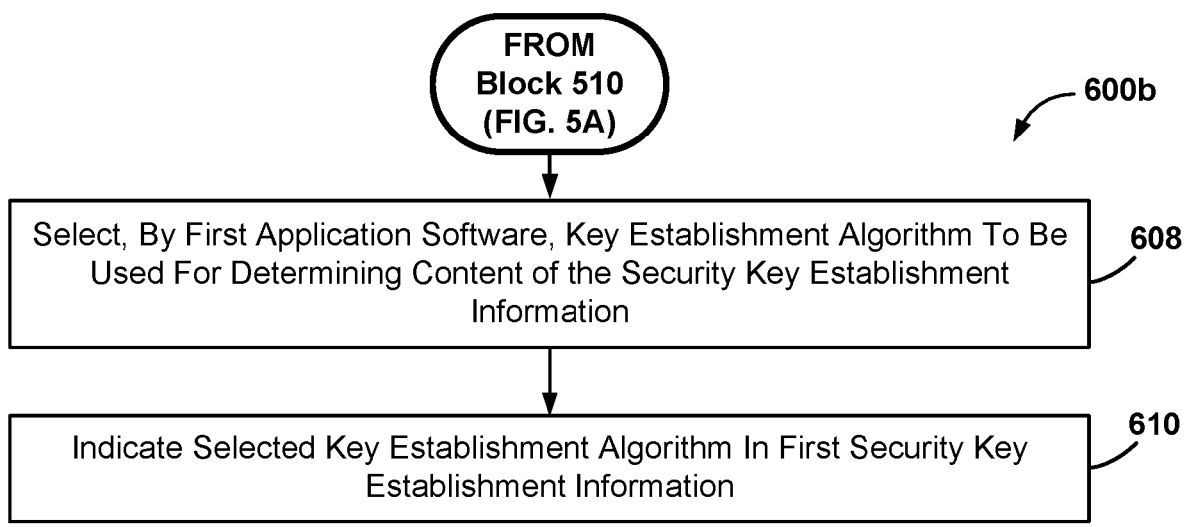

Referring to FIG. 6B, in some implementations following the operations of block 510 (FIG. 5A), in block 608, the processor may select, by the first application software, a key establishment algorithm to be used for determining content of the first security key establishment information.

In block 610, the processor may indicate the selected key establishment algorithm in the first security key establishment information. In some embodiments, the processor may include one or more elements of information indicating the selected key establishment algorithm.

Figure 6C:
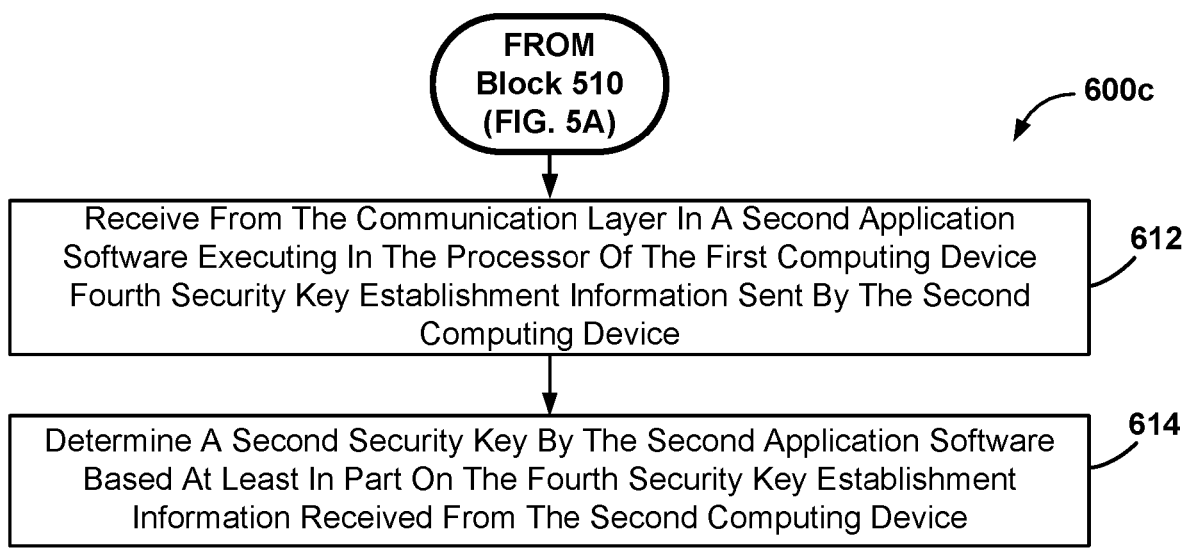

Referring to FIG. 6C, in some implementations following the operations of block 510 (FIG. 5A), in block 612, the processor may receive, from the communication layer in a second application software executing in the processor of the first computing device, fourth security key establishment information sent by the second computing device. For example, two or more applications executing in the processor of the first computing device may communicate with two or more applications executing in a processor of the second computing device.

In block 614, the processor may determine a second security key by the second application software based at least in part on the fourth security key establishment information received from the second computing device. For example, different applications executing on the first and second computing devices may determine different security keys for their communication.

Figure 6D:
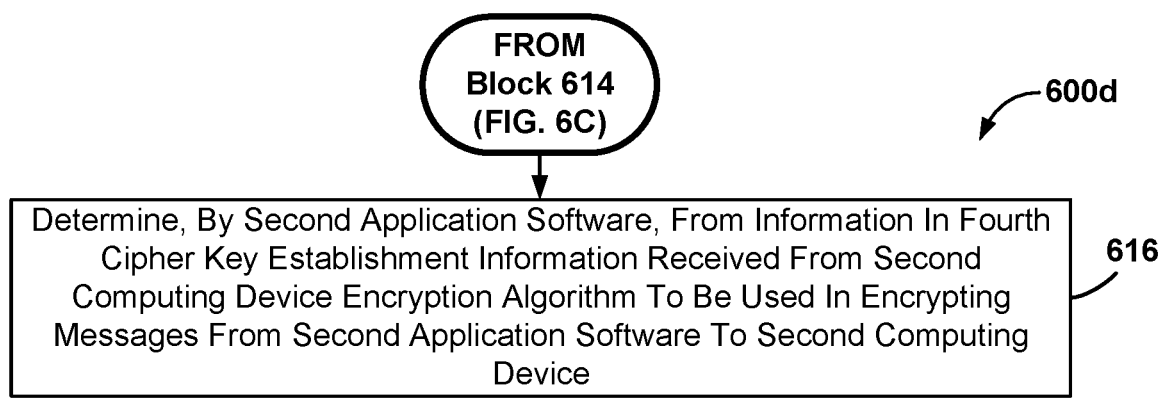

Referring to FIG. 6D, in some implementations following the operations of block 614 (FIG. 6C), in block 616, the processor may determine, by the second application software, from information in the fourth security key establishment information received from the second computing the key establishment mechanism to be used from the second application software to the second computing device.

Figure 6E:
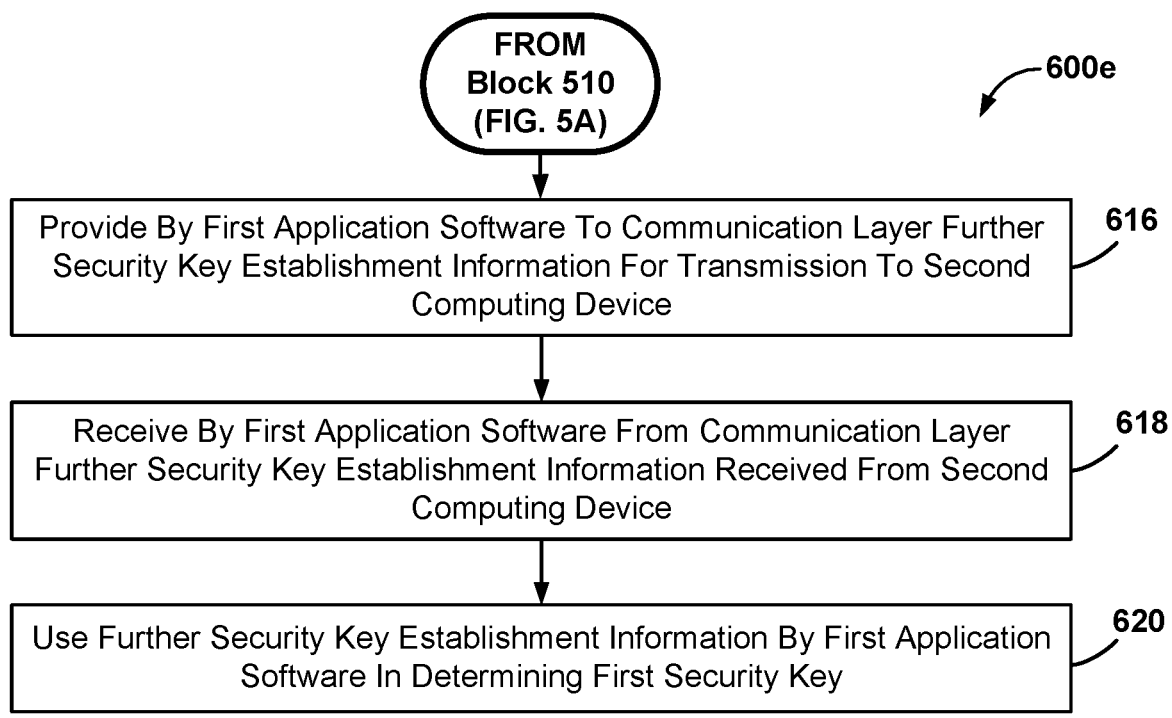

Referring to FIG. 6E, in some implementations following the operations of block 510 (FIG. 5A), in block 616, the processor may provide by the first application software to the communication layer further security key establishment information for transmission to the second computing device.

In block 618, the processor may receive by the first application software from the communication layer further security key establishment information received from the second computing device.

In block 620, the processor may use the further security key establishment information by the first application software in determining the first security key.

Figure 6F:
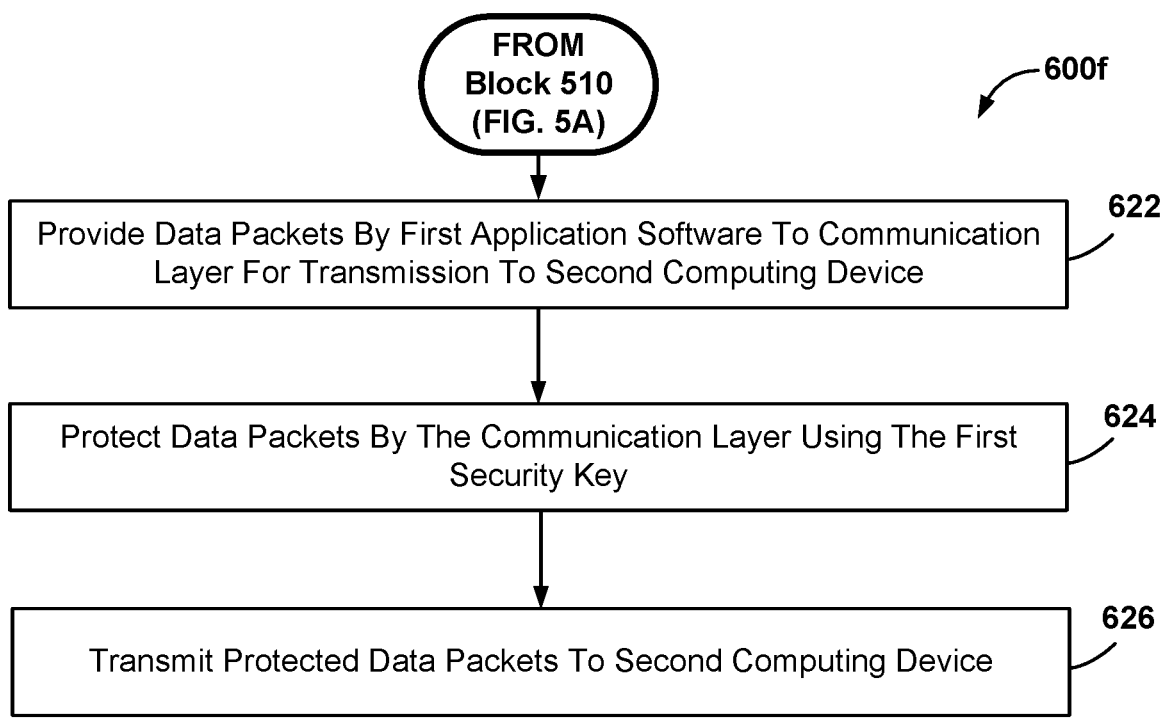

Referring to FIG. 6F, in some implementations following the operations of block 510 (FIG. 5A), in block 622, the processor may provide data packets by the first application software to the communication layer for transmission to the second computing device.

In block 624, the processor may protect the data packets by the communication layer using the first security key. In some embodiments, the communication layer may use the first security key to establish a secure tunnel or encrypted tunnel with the communication layer of the second computing device.

In block 626, the processor may transmit the protected data packets to the second computing device. In some embodiments, the processor may transmit the protected data packets to the second communication device by the communication layer using a ProSe protocol. In some embodiments, transmitting the protected data packets to the second computing device may include transmitting the protected data packets to the second computing device on a control plane bearer of the communication layer. In some embodiments, the control plane bearer may include a control plane bearer of a PC5 interface between the first computing device and the second computing device. In some embodiments, transmitting the protected data packets to the second computing device may include protecting data packets from the first application software by the communication layer using the first security key, and transmitting the protected data packets to the second computing device on a user plane bearer of the communication layer.

Figure 7:
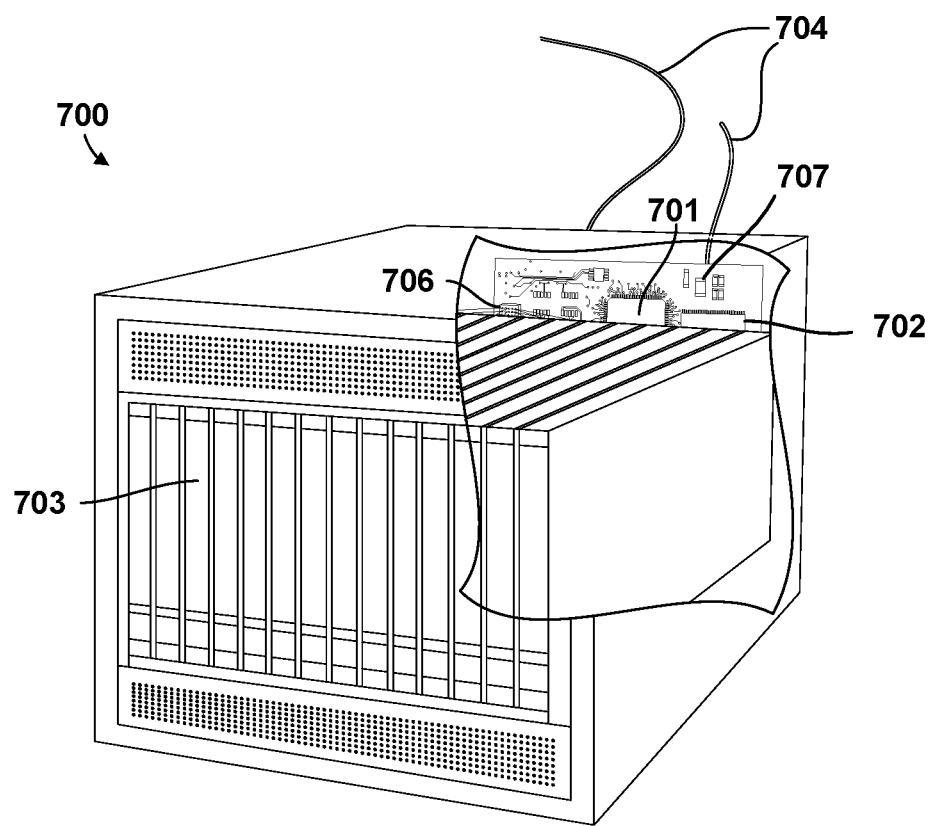
FIG. 7 is a component block diagram of a network computing device suitable for use with various embodiments.

Various embodiments may be implemented on a variety of network devices, an example of which is illustrated in FIG. 7 in the form of a network computing device 700 functioning as a network element of a communication network, such as a base station. Such network computing devices may include at least the components illustrated in FIG. 7. With reference to FIGS. 1-7, the network computing device 700 may typically include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
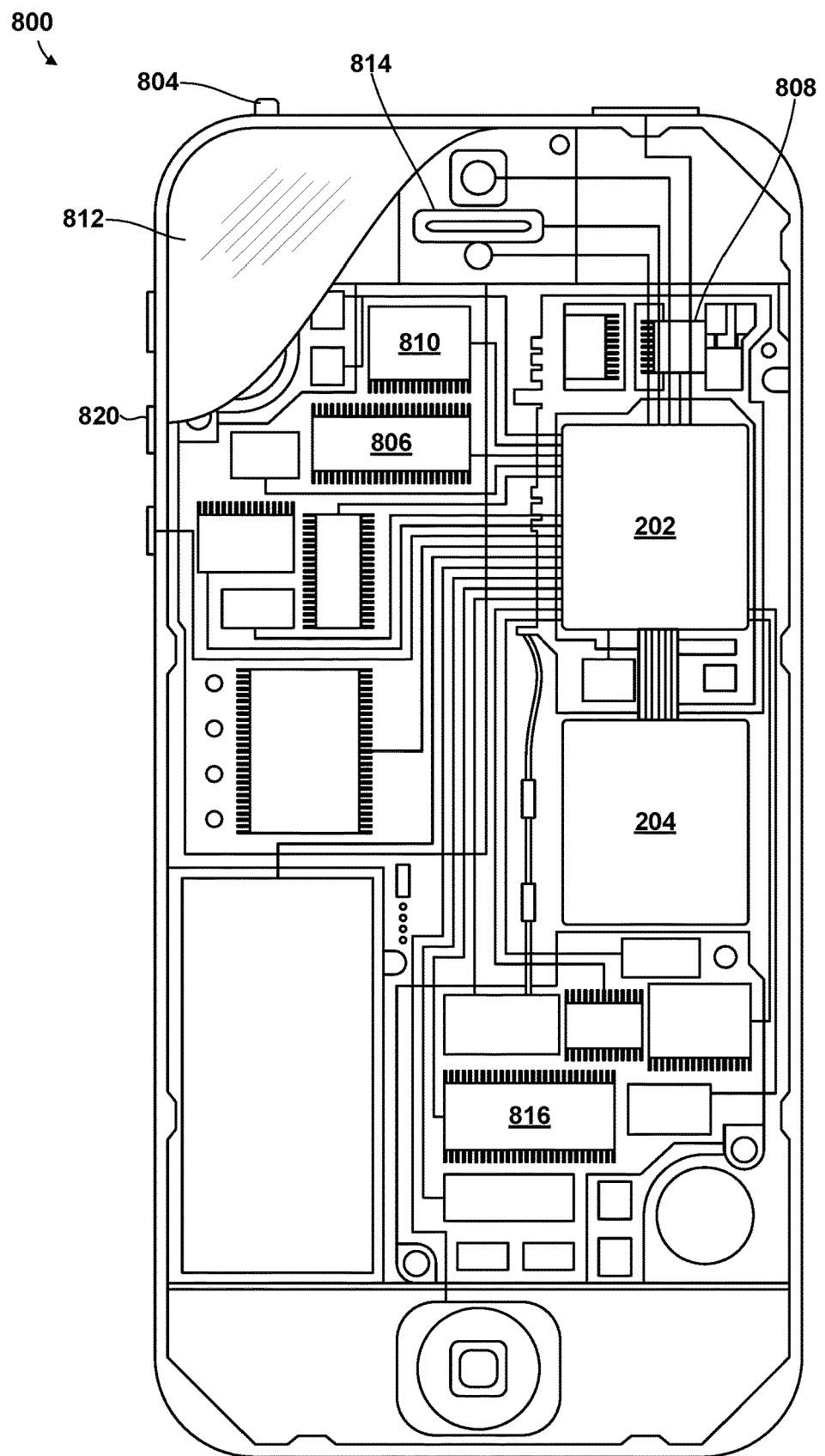
FIG. 8 is a component block diagram of a wireless communication device suitable for use with various embodiments.

Various embodiments may be implemented on a variety of wireless computing devices (e.g., a controller 160 of a vehicle 152*a*, or a wireless computing device 120*a*-120*c*, 200), an example of which is illustrated in FIG. 8 in the form of a smartphone 800. The smartphone 800 may include a first SOC 202 (e.g., a SOC-CPU) coupled to a second SOC 204 (e.g., a 5G capable SOC). The first and second SOCs 202, 204 may be coupled to internal memory 806, 816, a display 812, and to a speaker 814. Additionally, the smartphone 800 may include an antenna 804 for sending and receiving electromagnetic radiation that may be connected to a wireless data link and/or cellular telephone transceiver 808 coupled to one or more processors in the first and/or second SOCs 202, 204. Smartphones 800 typically also include menu selection buttons or rocker switches 820 for receiving user inputs.

A typical smartphone 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 808 and CODEC 810 may include a digital signal processor (DSP) circuit (not shown separately).

The processors of the wireless network computing device 700 and the smart phone 800 may be any programmable microprocessor, microcomputer or multiple processor chip or chips that can be configured by software instructions (applications) to perform a variety of functions, including the functions of the various embodiments described below. In some wireless computing devices, multiple processors may be provided, such as one processor within an SOC 204 dedicated to wireless communication functions and one processor within an SOC 202 dedicated to running other applications. Typically, software applications may be stored in the memory 806, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and circuitry (e.g., an SOC) of the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the Claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and 600a-600f may be substituted for or combined with one or more operations of the methods 500, and 600a-600f.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of providing secure communications between a first computing device and a second computing device, comprising:
   determining, in first application software in an application layer executing in a processor of the first computing device, first security key establishment information that is configured to enable second application software in an application layer executing in the second computing device to determine a first security key for use by a communication layer of the second computing device;
   providing the first security key establishment information from the application layer of the first computing device to a communication layer of the first computing device in a format for transmission by the communication layer of the first computing device to the second computing device without processing of the first security key establishment information related to security key generation by the communication layer of the first computing device;
   receiving, in the first application software in the application layer of the first computing device from the communication layer of the first computing device, second security key establishment information received from the second computing device;
   determining the first security key by the first application software in the application layer of the first computing device based at least in part on the second security key establishment information received from the second computing device; and
   providing the first security key from the application layer of the first computing device to the communication layer of the first computing device for use by the communication layer of the first computing device in protecting transmissions of messages from the first application software to the second computing device.

2. The method of claim 1, further comprising:
   receiving from the communication layer of the first computing device in the first application software in the application layer of the first computing device third security key establishment information sent by the second computing device;
   wherein determining the first security key by the first application software in the application layer of the first computing device based at least in part on the second security key establishment information received from the second computing device comprises determining the first security key based at least in part on the second security key establishment information and the third security key establishment information.

3. The method of claim 1, further comprising:
   selecting, by the first application software in the application layer of the first computing device, a key establishment algorithm to be used in determining content of the first security key establishment information; and
   indicating the selected key establishment algorithm in the first security key establishment information.

4. The method of claim 1, further comprising:
   receiving from the communication layer of the first computing device in a second application software in the application layer of the first computing device executing in the processor of the first computing device fourth security key establishment information sent by the second computing device;
   determining a second security key by the second application software in the application layer of the first computing device based at least in part on the fourth security key establishment information received from the second computing device; and
   determining, by the second application software in the application layer of the first computing device, from information in the fourth security key establishment information received from the second computing device, key establishment algorithm to be used from the second application software to the second computing device.

5. The method of claim 1, further comprising:
   providing by the first application software from the application layer of the first computing device to the communication layer of the first computing device further security key establishment information for transmission to the second computing device;
   receiving by the first application software in the application layer of the first computing device from the communication layer of the first computing device further security key establishment information received from the second computing device; and
   using the further security key establishment information by the first application software in determining the first security key.

6. The method of claim 1, further comprising:
   providing data packets by the first application software in the application layer of the first computing device to the communication layer of the first computing device for transmission to the second computing device;
   protecting the data packets by the communication layer of the first computing device using the first security key; and
   transmitting the protected data packets to the second computing device.

7. The method of claim 6, further comprising:
   transmitting the protected data packets to the second computing device by the communication layer via a PC5 protocol.

8. The method of claim 1, wherein the first application software is a vehicle-to-everything (V2X) application executing in the processor of the first computing device, which is a first in-vehicle computing device of a first vehicle, and the second computing device is a second in-vehicle computing device of a second vehicle.

9. The method of claim 1, wherein the communication layer of the first computing device is a PC5 layer of the first computing device.

10. The method of claim 1, further comprising:
    establishing, using the first security key, a communication layer security context with a communication layer of the second computing device.

11. The method of claim 1, wherein:
    the first security key establishment information and the second security key establishment information comprise information needed to be exchanged between the first application software and the second application software to enable the first application software and the second application software to determine the first security key;
    information content of the first security key establishment information and the second security key establishment information are transparent to the communication layer of each of the first computing device and the second computing device; and
    the first security key comprises a root key that comprises a 256-bit key.

12. The method of claim 1, further comprising:
transmitting the first security key establishment information to the second computing device on a control plane bearer of the communication layer, wherein the control plane bearer is a control plane bearer of a PC5 interface between the first computing device and the second computing device;
protecting data packets from the first application software by the communication layer using the first security key; and
transmitting the protected data packets to the second computing device on a user plane bearer of the communication layer.

13. A first computing device, comprising:
a memory; and
a processor coupled to the memory and configured with a communication layer and a software application layer configured to execute first application software in an application layer, wherein the processor is configured to perform operations comprising:
determining in the first application software in the application layer first security key establishment information that is configured to enable second application software in an application layer executing in a second computing device to determine a first security key for use by a communication layer of the second computing device;
providing the first security key establishment information from the application layer of the first computing device to the communication layer in a format for transmission by the communication layer to a second computing device without processing of the first security key establishment information related to security key generation by the communication layer of the first computing device;
receiving, in the first application software in the application layer of the first computing device from the communication layer, second security key establishment information received from the second computing device;
determining the first security key by the first application software in the application layer of the first computing device based at least in part on the second security key establishment information received from the second computing device; and
providing the first security key from the application layer of the first computing device to the communication layer of the first computing device for use by the communication layer in protecting transmissions of messages from the first application software to the second computing device.

14. The first computing device of claim 13, wherein the processor is configured to perform operations further comprising:
receiving from the communication layer of the first computing device in the first application software in the application layer of the first computing device third security key establishment information sent by the second computing device;
wherein determining the first security key by the first application software in the application layer of the first computing device based at least in part on the second security key establishment information received from the second computing device comprises determining the first security key based at least in part on the second security key establishment information and the third security key establishment information.

15. The first computing device of claim 13, wherein the processor is configured to perform operations further comprising:
selecting, by the first application software in the application layer of the first computing device, a key establishment algorithm to be used in determining content of the first security key establishment information; and
indicating the selected key establishment algorithm in the first security key establishment information.

16. The first computing device of claim 13, wherein the processor is configured to perform operations further comprising:
receiving from the communication layer in a second application software in the application layer of the first computing device executing in the processor of the first computing device fourth security key establishment information sent by the second computing device;
determining a second security key by the second application software in the application layer of the first computing device based at least in part on the fourth security key establishment information received from the second computing device; and
determining, by the second application software in the application layer of the first computing device, from information in the fourth security key establishment information received from the second computing device, key establishment algorithm to be used from the second application software to the second computing device.

17. The first computing device of claim 13, wherein the processor is configured to perform operations further comprising:
providing by the first application software from the application layer of the first computing device to the communication layer further security key establishment information for transmission to the second computing device;
receiving by the first application software in the application layer of the first computing device from the communication layer further security key establishment information received from the second computing device; and
using the further security key establishment information by the first application software in determining the first security key.

18. The first computing device of claim 13, wherein the processor is configured to perform operations further comprising:
providing data packets by the first application software in the application layer of the first computing device to the communication layer of the first computing device for transmission to the second computing device;
protecting the data packets by the communication layer using the first security key; and
transmitting the protected data packets to the second computing device.

19. The first computing device of claim 18, wherein the processor is configured to perform operations further comprising:
transmitting the protected data packets to the second computing device by the communication layer via a PC5 protocol.

20. The first computing device of claim 13, wherein:
the first application software is a vehicle-to-everything (V2X) application;
the first computing device is a first in-vehicle computing device of a first vehicle; and the second computing device is a second in-vehicle computing device of a second vehicle.

21. The first computing device of claim 13, wherein the communication layer is a PC5 layer of the first computing device.

22. The first computing device of claim 13, wherein the processor is configured to perform operations further comprising:
   establishing, using the first security key, a communication layer security context with a communication layer of the second computing device.

23. The first computing device of claim 13, wherein:
   the first security key establishment information and the second security key establishment information comprise information needed to be exchanged between the first application software and the second application software to enable the first application software and the second application software to determine the first security key;
   information content of the first security key establishment information and the second security key establishment information are transparent to the communication layer; and
   the first security key comprises a root key that comprises a 256-bit key.

24. The first computing device of claim 13, wherein the processor is configured to perform operations further comprising:
   transmitting the first security key establishment information to the second computing device on a control plane bearer of the communication layer, wherein the control plane bearer is a control plane bearer of a PC5 interface between the first computing device and the second computing device;
   protecting data packets from the first application software by the communication layer using the first security key; and
   transmitting the protected data packets to the second computing device on a user plane bearer of the communication layer.

25. A non-transitory processor-readable medium having stored thereon processor-executable instructions configured to cause a processor of a first computing device to perform operations comprising:
   determining, in first application software in an application layer executing in the processor, first security key establishment information that is configured to enable second application software in an application layer executing in a second computing device to determine a first security key for use by a communication layer of the second computing device;
   providing the first security key establishment information from the application layer of the first computing device to a communication layer of the processor in a format for transmission by the communication layer to a second computing device without processing of the first security key establishment information related to security key generation by the communication layer of the first computing device;
   receiving, in the first application software in the application layer of the first computing device from the communication layer of the processor, second security key establishment information received from the second computing device;
   determining the first security key by the first application software in the application layer of the first computing device based at least in part on the second security key establishment information received from the second computing device; and
   providing the first security key from the application layer of the first computing device to the communication layer of the first computing device for use by the communication layer of the processor in protecting transmissions of messages from the first application software to the second computing device.

26. The non-transitory processor-readable medium of claim 25, wherein the stored processor-executable instructions are configured to cause the processor to perform operations further comprising:
   receiving from the communication layer of the first computing device in the first application software in the application layer of the first computing device third security key establishment information sent by the second computing device;
   wherein determining the first security key by the first application software in the application layer of the first computing device based at least in part on the second security key establishment information received from the second computing device comprises determining the first security key based at least in part on the second security key establishment information and the third security key establishment information.

27. The non-transitory processor-readable medium of claim 25, wherein the stored processor-executable instructions are configured to cause the processor to perform operations further comprising:
   selecting, by the first application software in the application layer of the first computing device, a key establishment algorithm to be used in determining content of the first security key establishment information; and
   indicating the selected key establishment algorithm in the first security key establishment information.

28. The non-transitory processor-readable medium of claim 25, wherein the stored processor-executable instructions are configured to cause the processor to perform operations further comprising:
   receiving from the communication layer of the processor in a second application software in the application layer of the first computing device executing in the processor of the first computing device fourth security key establishment information sent by the second computing device;
   determining a second security key by the second application software in the application layer of the first computing device based at least in part on the fourth security key establishment information received from the second computing device; and
   determining, by the second application software in the application layer of the first computing device, from information in the fourth security key establishment information received from the second computing device, key establishment algorithm to be used from the second application software to the second computing device.

29. The non-transitory processor-readable medium of claim 25, wherein the stored processor-executable instructions are configured to cause the processor to perform operations further comprising:
   providing by the first application software from the application layer of the first computing device to the communication layer of the processor further security key establishment information for transmission to the second computing device;

receiving by the first application software in the application layer of the first computing device from the communication layer of the processor further security key establishment information received from the second computing device; and using the further security key establishment information by the first application software in determining the first security key.

30. The non-transitory processor-readable medium of claim 25, wherein the stored processor-executable instructions are configured to cause the processor to perform operations further comprising:

providing data packets by the first application software in the application layer of the first computing device to the communication layer of the processor for transmission to the second computing device;

protecting the data packets by the communication layer of the processor using the first security key; and transmitting the protected data packets to the second computing device.

31. The non-transitory processor-readable medium of claim 30, wherein the stored processor-executable instructions are configured to cause the processor to perform operations further comprising:

transmitting the protected data packets to the second computing device by the communication layer via a PC5 protocol.

32. The non-transitory processor-readable medium of claim 25, wherein:

the first application software is a vehicle-to-everything (V2X) application executing in the processor;

the first computing device is a first in-vehicle computing device of a first vehicle; and the second computing device is a second in-vehicle computing device of a second vehicle.

33. The non-transitory processor-readable medium of claim 25, wherein the stored processor-executable instructions are configured to cause the processor to perform operations such that the communication layer of the processor is a PC5 layer of the processor.

34. The non-transitory processor-readable medium of claim 25, wherein the stored processor-executable instructions are configured to cause the processor to perform operations further comprising:

establishing, using the first security key, a communication layer security context with a communication layer of the second computing device.

35. The non-transitory processor-readable medium of claim 25, wherein the stored processor-executable instructions are configured to cause the processor to perform operations such that:

the first security key establishment information and the second security key establishment information comprise information needed to be exchanged between the first application software and the second application software to enable the first application software and the second application software to determine the first security key;

information content of the first security key establishment information and the second security key establishment information are transparent to the communication layer of each of the first computing device and the second computing device; and the first security key comprises a root key that comprises a 256-bit key.

36. The non-transitory processor-readable medium of claim 25, wherein the stored processor-executable instructions are configured to cause the processor to perform operations further comprising:

transmitting the first security key establishment information to the second computing device on a control plane bearer of the communication layer, wherein the control plane bearer is a control plane bearer of a PC5 interface between the first computing device and the second computing device;

protecting data packets from the first application software by the communication layer using the first security key; and transmitting the protected data packets to the second computing device on a user plane bearer of the communication layer.

37. A first computing device, comprising:

means for determining in first application software in an application layer of the first computing device first security key establishment information that is configured to enable second application software in an application layer executing in a second computing device to determine a first security key for use by a communication layer of the second computing device;

means for providing the first security key establishment information from the application layer of the first computing device to a communication layer of the first computing device in a format for transmission by the communication layer of the first computing device to the second computing device without processing of the first security key establishment information related to security key generation by the communication layer of the first computing device;

means for receiving, in the first application software in the application layer of the first computing device from the communication layer of the first computing device, second security key establishment information received from the second computing device;

means for determining the first security key by the first application software in the application layer of the first computing device based at least in part on the second security key establishment information received from the second computing device; and means for providing the first security key from the application layer of the first computing device to the communication layer of the first computing device for use by the communication layer of the first computing device in protecting transmissions of messages from the first application software to the second computing device.

* * * * *